Jan. 17, 1956          M. J. BARR          2,731,240

THERMAL PROPORTIONAL TIMERS

Filed Nov. 17, 1953

INVENTOR.

MALCOLM J. BARR

BY

*Harry R. Lubcke*

AGENT

United States Patent Office 2,731,240
Patented Jan. 17, 1956

2,731,240

THERMAL PROPORTIONAL TIMERS

Malcolm J. Barr, Huntington Park, Calif., assignor to Wayne H. Allen, Phillip L. Savage, and Clarence L. Lapham, all of California Application November 17, 1953, Serial No. 392,653

10 Claims. (Cl. 257—3)

My invention relates to the art of timing plural thermal processes and to means adapted to automatically control the same under dissimilar conditions.

In the prior art difficulty has been encountered in providing the correct amount of heat to any particular execution of a thermal process independent of the history of prior processing. Because of this difficulty it has been common practice to preheat thermal processing devices, since only with such conditioning were timers of the prior art capable of satisfactory processing control. Alternately, a manually operated "Hot," "Cold" lever has been required to compensate for such conditions, as shown by R. Mueller in his U. S. Patent 2,605,832.

Preheating time is non-productive. Manual compensators require additional skill and attention on the part of the operator and cause malfunctioning if incorrectly placed. Also, timers of the prior art have controlled less than a full cycle of processing, requiring that the cooling cycle, for example, be terminated by manually operating a switch.

To provide a timer capable of automatically controlling thermal processing regardless of the history of prior processing is an object of this invention.

Another object is to automatically compensate for ambient temperature in such processing.

Another object is to initiate and/or terminate plural steps in the related thermal process, automatically completing a cycle without human attention.

Another object is to accomplish correlation between timer and processing device by adjusting the thermal properties of each to be proportional, one to the other, as to the phases of the processing cycle involved.

Another object is to provide auxiliary manual electrical controls for shortening or lengthening the heating or cooling phases of the thermal cycle without readjusting the timer.

Another object is to provide a timing control device capable of automatically controlling plural process steps which is relatively precise, rugged, inexpensive, easy to construct and easy to adjust.

The ways in which these objects are attained is illustrated in the accompanying drawing, in which.

Briefly, I overcome the difficulties of the prior art by providing a timer which is thermally related to and simultaneously cycled with the processing device which it controls, but is heated and cooled by separate portions of the thermal agents accomplishing the heating and cooling. The temperature cycle of the timer is proportional to that of the device, not necessarily equal. Plural electrical contactors are actuated by thermal expansion in the timer and a relay and auxiliary switches are provided to automatically accomplish a thermal cycle of plural phases in coaction with the timer.

Figure 1:
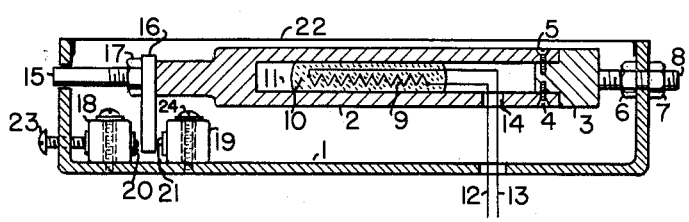
Fig. 1 shows a side elevation of the timer mechanism.
Figure 2:
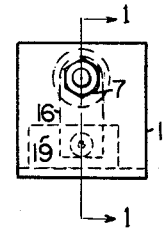
Fig. 2 shows an end elevation of the timer mechanism.

In Fig. 1, numeral 1 indicates a rigid frame constructed of steel or of another material having a nominal or small coefficient of thermal expansion. An expansion unit 2 of aluminum or another material having a reasonably greater coefficient of thermal expansion in relation to the frame is fastened rigidly to the frame. This is accomplished by piece 3, to which the rest of the unit is attached by screws 4 and 5 and the piece, in turn, to the frame by nuts 6 and 7 engaged on the threaded portion 8 thereof. A heater 9 is shown of the electrical type having an electrical insulating surround 10. This is fitted in a hollow recess 11 of expansion unit 2, with external connecting wires 12 and 13 passing through an appropriate insulated bushing 14 to the exterior.

The opposite end 15 of the expansion unit 2 slides as a loose fit in the hole shown in frame 1 as the unit heats and cools. Operating arm 16 is rigidly fabricated and attached to the expansion unit, as by nut 17. Positioned adjacent to the operating arm are a plurality of switches 18 and 19, having actuating plungers 20 and 21 essentially in contact with the arm. These switches are preferably, though not necessarily, of the type known as Microswitches, characterized by opening or closing a circuit upon displacement of the plungers a very small fraction of an inch. Switches 18 and 19 are electrically closed when the plungers extend out of the same a maximum amount. Arm 16 and the switches are so located that plunger 20 is out and plunger 21 in when the timer is cold.

Figure 3:
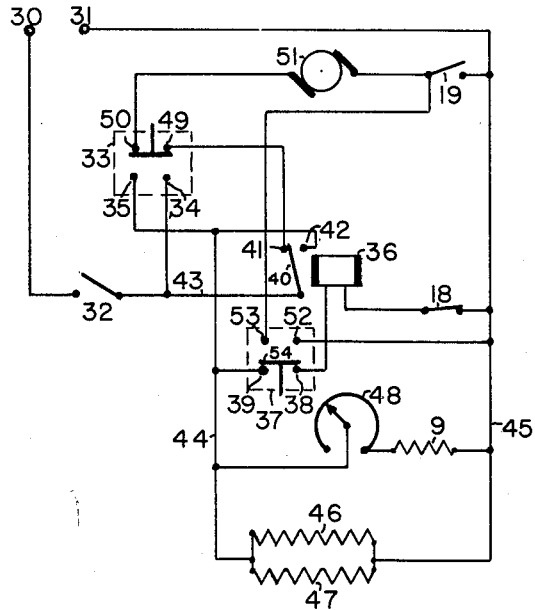
Fig. 3 shows the schematic electric circuit of the timer and related elements of the processing device.

A complete thermal processing cycle is automatically accomplished with my device by coaction of the elements shown schematically in Fig. 3. Elements 9, 18 and 19 comprise the electrical entities of the timer of Fig. 1. Terminals 30 and 31 are the points at which electric power is introduced, 115 volts 60 cycle alternating current in the typical case, although any practical voltage and any frequency including direct current may be utilized with due attention to the values and construction of the elements of the circuit.

Switch 32 is of the toggle variety and serves to switch the whole device on at the start of a series of operations and off thereafter. When initially switched on, nothing happens until momentary contact start switch 33 is depressed. This closes contacts 34, 35 and energizes the relay coil 36. The rest position of momentary contact switch 37 is such that contacts 38 and 39 are normally closed and microswitch 18 is also closed when the expansion unit 2 of the timer is in the contracted or cold condition.

Energizing the relay coil results in the relay arm 40 breaking connection to contact 41 and making connection to contact 42. This causes the electric circuit to be completed from switch 32 through wire 43, arm 40, contact 42 to bus (wire) 44. Connected between buses 44 and 45 are a plurality of resistance units 46, 47. These are imbedded in the main heating members of the processing device. These may be of relatively high electrical resistance, dissipating a few watts of electrical energy for accomplishing mild heating as required for a biological experiment, or may represent the carbons of an electric furnace, dissipating thousands of kilowatts of electrical energy for melting steel. Only appropriate carrying capacity is required of the several switches, relay and conductors as known to the art in order to fit these elements to the processing device. The timer itself need not be altered, as will be more fully apparent later.

The timer heating circuit is comprised of heater 9, previously described and shown in Fig. 1, and rheostat 48 in series across the two power buses 44 and 45. The minimum time of the heating cycle is obtained when the resistance of rheostat 48 is adjusted to substantially zero. In that condition the resistance of the series circuit consists of that of heater 9 alone, the current has a maximum value and so does the heating effect I²R in heater 9. Increasing the circuit resistance by adjusting rheostat 48 has the effect of increasing the duration of the heating cycle, since the rate of electrical energy input is less and thus the time required to reach the temperature and corresponding elongation of expansion unit 2 to operate switch 18 is greater.

In any case, when expansion unit 2 operates switch 18 because of increased temperature the contacts are opened. The same elongation closes the contacts of switch 19. Opening switch 18 interrupts the current through coil 36 of the relay, thus breaking the circuit between contact 42 and arm 40. This removes power from bus 44 and stops heating in elements 9, 46 and 47.

At the same time, closing the circuit between relay contact 41 and arm 40 connects electrical energy from wire 43 through normally closed contacts 49 and 50 to one terminal of motor 51. Switch 19 now being closed, the circuit is completed therethrough to terminal 31 and the motor is actuated. In a typical embodiment motor 51 may drive a fan or blower arranged to cool both processing device and timer, as shown in Fig. 4.

Figure 4:
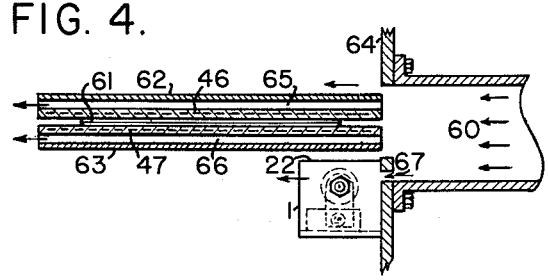
Fig. 4 shows the timer in relation to the coacting portion of a processing device, the view being in sectional elevation.

In Fig. 4 arrows 60 indicate a flow of cold air or other cooling fluid caused to enter the working area of the device and timer when means 51 (Fig. 3) is actuated. In Fig. 4 the device is illustrated as a thermal press, in which numeral 61 indicates the work. Upper and lower platen members 62 and 63 retain the work and are structurally attached to the main frame of the device 64 in a manner that is not a part of this invention. The platens are formed with a plurality of cooling orifices illustrated in the sectional view by 65 and 66. Closer to the work are heating resistor units 46 and 47. The cooling fluid flows above, through and below the platens as shown by the arrows.

The timer frame 1 is attached to the device frame 64 as shown. One of a plurality of separate small holes is shown at 67. These are provided to supply a separate stream of cooling fluid to the timer for the purpose of cooling it independently of the device. It is for this reason that convection shield 22 is provided at the top of the timer frame 1. In one preferred embodiment three holes 67 are utilized having a ratio of area to the main cooling orifice area of about 5%.

Because of the independent heating and cooling facilities for my timer I have found it by test to be more accurate than arrangements of the prior art inherently identified with the thermal elements of the processing device. For the reason that the temperature range of my timer need not be the same as that of the process which it controls the name "proportional" timer is used. This is of great practical advantage, since for processes of limited thermal range, such as biological ones, the timer thermal range may be greater, thus insuring reliability of functioning. On the other hand, for processes of extreme thermal range, such as melting steel in an electric furnace, the timer thermal range is smaller than that of the process to avoid destructive influences affecting the timer.

As an alternate in cooling, motor 51 may drive a mechanical refrigerating machine, the cooling coils thereof thermally associated with the processing device and timer in a manner enalogous to that described above. Devices other than a motor may be employed for cooling and would be substituted in the circuit in lieu thereof.

As the cooling portion of the thermal cycle progresses the elongation of expansion unit 2 of the timer decreases. When this has progressed to a degree determined by adjustments to be later described, switch 19 opens and switch 18 closes. When switch 19 opens the motor stops and with switch 18 closed the apparatus is reset for the next cycle, again inaugurated by depressing switch 33.

In usual operation the maximum heating temperature of the processing device is fixed and is determined by the setting of the adjustments of the timer. This does not mean that the interval of heating time is fixed; an aspect of great value in my device. When the processing device and timer are cold the expansion unit 2 of the timer is shorter than normal and the distance between the operating point of switch 18 and the adjacent surface of arm 16 is greater than normal. Thus, a longer time is required to operate the switch and the desired final temperature is reached regardless of the initial temperature. By this characteristic, inherent in the construction of my timer, I avoid the common practice of preheating a thermal processing device. This is always an advantage, but particularly so when the device is only occasionally used for a few thermal cycles at a time, allowing unskilled help to do good work on an intermittent demand.

I also overcome the effect of ambient temperature in the same manner and thereby achieve certain objects of my invention.

Thus far the operation of switch 37 has not been described. It is a manually operated cooling control which is not operated in normal use. It will be noted that contacts 38, 39 thereof are in series with timer switch 18 and contacts 52, 53 in shunt with timer switch 19. Actuation of switch 37 performs the operations of opening switch 18 and closing switch 19; i. e., terminates the heating phase of the cycle and inaugurates the cooling phase. Consequently, for special processing requiring a shorter heating cycle or to cool the processor in order to correct an error, switch 37 may be manually held upward and the cooling phase of the cycle started at any time during processing. A spring, not shown, normally holds the contact bar 54 against contacts 38 and 39.

In the same way, manually depressing switch 33 extends the heating time of the cycle. Opening contacts 49, 50 prevents the cooling device 51 from functioning and maintains electric power connection to bus 44 so that resistor units 46 and 47 continue to be energized regardless of the automatic opening of timer switch 18.

As has been described, adjustment of the heating phase of my timer is normally accomplished by rheostat 48. If the minimum period thereof is to be shortened the position of switch 18 is moved relative to frame 1 to be closer to arm 16, as by turning adjusting screw 23 farther inwardly. The required adjustment is only a very small fraction of an inch.

Adjustments of the cooling time and the ratio between the duration of the heating and cooling phases of the thermal cycle are normally accomplished by changing the position of the expansion unit 2 with respect to switches 18 and 19 by adjusting nuts 6 and 7. Adjustment of the position of switch 19 alters the duration of the cooling phase only and may be accompanied by loosening the screw 24 and retightening within the oversize hole of the switch body. After initial fabrication adjustments at 23 and 6, 7 are usually sufficient to achieve desired functioning.

The above adjustments give an extended range of timing. By altering the wattage of heater unit 9 or the dimensions and thus the thermal capacity of expansion unit 2 still other ranges may be reached. The thermal capacity of unit 2 is usually related to the wattage of the heating unit 9 in the same proportion as the corresponding elements of the processing device. When greater mass is required in the expansion unit it is preferable to increase the length thereof so that greater movement is obtained at arm 16. The proportions given in Fig. 1 are highly satisfactory, but for other thermal capacities the fundamental advantage of increased length is to be availed.

Certain proportions and practical values have been given in this specification to most distinctly point out how a preferred embodiment of my invention is to be constructed and used. Numerous other proportions and values are possible without departing from my invention, which is defined in the following claims.

I claim:

1. An electro-thermal device comprising, in combination, a thermal working body, electrical means for heating the same, other means for cooling the same, a thermally expansible member, electrical means separate from said prior heating means for heating the same, means for simultaneously applying electrical energy to both of said electrical heating means, a switch positioned in relation to said expansible member to open upon a predetermined linear expansion thereof, said switch connected between both said electrical heating means and a source of electric power to simultaneously remove electrical energy from both the electrical heating means, another switch positioned in relation to said expansible member to close upon approximately the same expansion of said member, said other switch connected between said cooling means and said source of power, said cooling means positioned to cool both said body and said expansible member with separate portions of the cooling medium of said cooling means, said other switch being opened upon contraction of said expansible member occasioned by said cooling.

2. A compensated automatic electro-thermal device comprising, in combination, a thermal working area, electrical means for heating the same, other means for cooling the same, a thermally expansible metal member, electrical means therewithin for separately heating the same, a circuit for simultaneously applying electrical energy to both of said electrical heating means, a switch positioned in relation to said expansible member to open upon a predetermined linear expansion thereof by contact therewith, said switch in the circuit of both said electrical heating means to simultaneously deenergize the same, a second switch positioned in relation to said expansible member to close upon the same said expansion of said member by contact therewith, said second switch energizing said cooling means, said cooling means arranged to simultaneously cool both said area and said expansible member with separate portions of the cooling medium of said cooling means, said second switch being opened upon a predetermined contraction of said expansible member occasioned by said cooling, thereby deenergizing said cooling means at the end of the thermal cycle.

3. In the combination of a timer and a thermal processing device having heating and cooling means separate from said timer, a timer comprising a hollow thermally expansive rod, an insulated electrical heating coil within said rod, a frame, means to rigidly attach one end of said rod to said frame, a switch adjacent said rod and contacting the same, being actuated upon increase of length of said rod, said switch removing electrical energy from said heating coil and simultaneously deenergizing the heating means of said processing device, a second switch also adjacent said rod and contacting the same, being actuated at approximately the same increase of length of said rod, said second switch energizing the cooling means of said processing device, said rod being cooled concomitantly with the cooling of said device by separate portions of the cooling medium of said cooling means, said switches being at the end of said rod opposite the end attached to said frame.

4. In combination, a timer and a thermal processing device comprising, a timer frame, a thermally expansible mono-metallic member attached at one end to said frame, a heater thermally related to said member, thermal processing parts in said device, a second heater thermally related to said parts, an electrical circuit for simultaneously energizing both said heaters, a switch mechanically related to said expansible member to simultaneously deenergize both said heaters upon a given linear expansion of said member, a second switch mechanically related to said expansible member to energize cooling means upon said given linear expansion of said member, a portion of the cooling effect of said means cooling said processing parts and a separate portion cooling said expansible member, said second switch deenergizing said cooling means when said expansible member has contracted from said given expansion thereof and an additional manually operated switch, the thermal cycle of said processing device being inaugurated upon momentary closing said manual switch.

5. In combination, a thermal processing device and timer therefor comprising, a timer frame, a thermally expansible member attached at one end to said frame, an electric heater thermally related to said member, thermal processing parts in said device, a second electric heater thermally related to said parts and electrically connected in parallel with said first heater, a circuit comprising a source of electric power, a relay and a manual switch, said circuit formed to connect said heaters to said power source through said relay upon operation of said manual switch, a switch mechanically related to said expansible member and connected in said circuit to simultaneously deenergize both said heaters upon a given expansion of said member relative to that of said timer frame, a second switch mechanically related to said expansible member, electrically powered cooling means series connected to said second switch and the combination connected to said circuit, said second switch closing upon approximately said given expansion of said member thereby energizing said cooling means, said cooling means positioned to simultaneously cool said processing parts and said expansible member with different portions of the total cooling effect of said means, said second switch deenergizing said cooling means when said expansible member has contracted from said given expansion thereof, said first switch closing upon said contraction of said expansible member but said relay disconnecting said power source from said heaters until said manual switch is again operated.

6. Apparatus according to claim 5 wherein a second manual switch having a double throw is included in said circuit, operation of said switch opening said circuit between said power source and said heaters by deenergizing said relay and concomitantly energizing said cooling means, said operations being accomplished irrespective of the relation between said expansible member and the switches mechanically related thereto for the purpose of accomplishing manual control of said thermal processing without altering the adjustments of said timer.

7. Apparatus according to claim 5 wherein said cooling means comprises a motor-driven fan positioned with respect to said processing parts and said timer to force a separate portion of the air discharge thereof over said parts and said timer.

8. In combination with a thermal processing device a thermal timer comprising, a relatively non-thermally expansive frame, a hollow cylindrical mono-metallic thermally expansive member attached at one end to said frame, an electrical heating unit within said expansive member, an arm attached to said member on the end away from said attached end thereof, an electric switch positioned on each side of said arm with the actuating elements thereof adjacent said arm, said switches attached to said frame, means to adjust the relative positions of said arm member, frame and switches, said switch farthest from said attached end of said expansive member connected in circuit with said heating unit, a source of electric power, said farthest switch positioned with respect to said arm to open the circuit between said heating unit and said source of power upon a linear elongation of said expansive member induced by the heat produced in said heating unit, electrically operated cooling means, said other switch positioned with respect to said arm to actuate said cooling means upon said elongation and to deactuate said means upon contraction of said expansive member, said timer structure essentially separate from said thermal processing device and cooled by a separate portion of the working medium of said cooling means.

9. In combination, a processing device and a timer thermally related thereto to accomplish uniform processing regardless of the prior thermal history of said device comprising a main frame of said device, a frame of said timer in thermal contact therewith, a member attached at one end to said timer frame of a material having a different coefficient of thermal expansion than that of said timer frame, separate electrical means for separately and simultaneously heating said processing device and said member to different temperatures, an electrical circuit for said means, a switch attached upon said timer frame actuatingly related to said member, connected in said circuit and sensed to open said circuit upon said member assuming a given elevated temperature, a second switch similarly related to said member, electrically actuated cooling means, an electrical circuit for said cooling means, said second switch sensed to close the circuit for said cooling means upon said member assuming a given elevated temperature, and means to adjust the position of said member relative to said frame and said switches to require a longer linear travel of said member with respect to said first switch when said device and timer are cold than when said device and timer are warm.

10. In combination, a thermal processing device and controlling timer therefor comprising, a metal timer frame, a metal thermally expansible member having a coefficient of expansion greater than said frame attached at one end to said frame, an electric heater within said member, two platens in said processing device, a second electric heater within the structure of said platens and electrically connected in parallel with said first heater and a rheostat, a circuit comprising a source of electric power, a two throw relay and a manual switch, said circuit formed to connect said heaters to said power source through said relay upon operation of said manual switch, a switch operable upon small actuating movement positioned adjacent said expansible member and connected in said circuit to open and thereby to disconnect all said heaters from said power source upon a given expansion of said member relative to that of said timer frame and to change the throw of said relay, a second switch, similarly operable, positioned oppositely to said first switch with respect to the expansion of said expansible member, electrically powered fluid means for cooling series connected to said second switch and the combination connected to said prior circuit, said second switch closing prior to the opening of said first switch, said cooling means thereby being energized from said power source through said changed throw of said relay, said cooling means positioned to simultaneously cool said platens and said expansible member with different unequal portions of said fluid, said second switch disconnecting said cooling means from said power source when said expansible member has contracted from said given expansion thereof, said first switch closing upon said contraction of said expansible member, said changed throw of said relay disconnecting said power source from said heaters until said manual switch is again operated, the time interval for said given expansion of said expansible member being determined by the resistance adjustment of said rheostat.

References Cited in the file of this patent

UNITED STATES PATENTS

| | | |
|---|---|---|
| 1,052,816 | Hadaway, Jr. | Feb. 11, 1913 |
| 2,148,203 | Jones | Feb. 21, 1939 |
| 2,213,956 | Drake | Sept. 10, 1940 |
| 2,220,061 | Brown | Nov. 5, 1940 |
| 2,403,798 | Holmes | July 9, 1946 |
| 2,410,384 | Lindsay | Oct. 29, 1946 |
| 2,623,449 | Losee | Dec. 30, 1952 |